(12) United States Patent
Mori

(10) Patent No.: US 11,029,634 B2
(45) Date of Patent: Jun. 8, 2021

(54) IMAGE FORMING APPARATUS

(71) Applicant: Brother Kogyo Kabushiki Kaisha, Nagoya (JP)

(72) Inventor: Hirotaka Mori, Nagoya (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 0 days.

(21) Appl. No.: 16/805,119

(22) Filed: Feb. 28, 2020

(65) Prior Publication Data

US 2020/0278632 A1 Sep. 3, 2020

(30) Foreign Application Priority Data

Feb. 28, 2019 (JP) ............................. JP2019-036569

(51) Int. Cl.
*G03G 15/00* (2006.01)
*G06F 3/12* (2006.01)

(52) U.S. Cl.
CPC ..... *G03G 15/5016* (2013.01); *G03G 15/5066* (2013.01); *G06F 3/128* (2013.01)

(58) Field of Classification Search
CPC ............................ G03G 15/5066; G06F 3/128
See application file for complete search history.

(56) References Cited

U.S. PATENT DOCUMENTS

| 7,705,873 B2 | 4/2010 | Kuse | |
|---|---|---|---|
| 2007/0229570 A1* | 10/2007 | Ohmiya | G03G 15/5066 347/19 |
| 2007/0243748 A1 | 10/2007 | Kuse | |
| 2008/0158583 A1* | 7/2008 | Yomogida | G03G 15/5016 358/1.13 |
| 2009/0237723 A1* | 9/2009 | Ueda | G03G 15/55 358/1.15 |
| 2013/0286433 A1 | 10/2013 | Matsushima et al. | |
| 2014/0147154 A1* | 5/2014 | Arai | G03G 15/50 399/75 |
| 2014/0300915 A1 | 10/2014 | Ishikura | |
| 2017/0034373 A1* | 2/2017 | Shigeno | H04N 1/0083 |
| 2018/0348664 A1* | 12/2018 | Okamura | G03G 15/0856 |
| 2020/0285188 A1* | 9/2020 | Okamoto | G03G 15/80 |

FOREIGN PATENT DOCUMENTS

| JP | 2007-074622 A | 3/2007 |
|---|---|---|
| JP | 2007-286395 A | 11/2007 |
| JP | 2013-107356 A | 6/2013 |
| JP | 2017-094741 A | 6/2017 |

* cited by examiner

*Primary Examiner* — Carla J Therrien
(74) *Attorney, Agent, or Firm* — Banner & Witcoff, Ltd.

(57) ABSTRACT

An image forming apparatus includes first and second casings, a support portion, a control panel, and a USB port. The first casing houses an image forming unit and includes a sheet discharge tray configured to support a sheet discharged by a discharge roller. The second casing is disposed above the first casing, and houses an image scanner. The support portion is disposed at a top surface of the first casing such that the support portion support raises the second casing, and partially defines an open portion that enables an access to the sheet discharged on the sheet discharge tray. The control panel is disposed at the second casing. A downstream end portion of the control panel is positioned downstream of the discharge roller in a discharging direction. The USB port is positioned above the sheet discharge tray, and overlaps, when viewed from the top, with the sheet discharge tray.

12 Claims, 9 Drawing Sheets

IMAGE FORMING APPARATUS

CROSS-REFERENCE TO RELATED APPLICATION

This application claims priority from Japanese Patent Application No. 2019-036569 filed on Feb. 28, 2019, the content of which is incorporated herein by reference in its entirety.

TECHNICAL FIELD

Aspects of the disclosure relate to an image forming apparatus.

BACKGROUND

A known image forming apparatus includes a movable universal serial bus ("USB") port. The USB port may reduce its damages, for example, caused by force or impact applied by a user's hitting with a USB device (e.g., a USB memory) inserted into the USB port, because the USB port moves when the force is applied thereto.

SUMMARY

Damages to the USB port may be reduced due to the configuration of the USB port. However, the USB port may move when a USB device is inserted into the USB port, which may lead to reduced operability.

Aspects of the disclosure provide an image forming apparatus including a novel USB port.

According to one or more aspects of the disclosure, an image forming apparatus comprises a first casing, a second casing, a support portion, a control panel, and a USB port. The first casing houses an image forming unit configured to form an image on a sheet. The first casing includes a sheet discharge tray configured to support the sheet discharged by a discharge roller. The second casing is disposed above the first casing. The second casing houses an image scanner configured to scan an image on a document. The support portion is disposed at a top surface of the first casing such that the support portion support raises the second casing. The support portion partially defines an open portion that enables an access to the sheet discharged on the sheet discharge tray. The control panel is disposed at the second casing. A downstream end portion of the control panel is positioned downstream of the discharge roller in a discharging direction. The control panel is configured to enable operations of the image forming unit and the image scanner. The USB port is configured to receive a USB device. The USB port is positioned above the sheet discharge tray and overlaps, when viewed from the top, with the sheet discharge tray.

According to one or more aspects of the disclosure, an image forming apparatus comprises a first casing, a second casing, a support portion, a control panel, and a USB port. The first casing houses an image forming unit configured to form an image on a sheet. The first casing includes a sheet discharge tray configured to support the sheet discharged by a discharge roller. The second casing is disposed above the first casing. The second casing houses an image scanner configured to scan an image on a document. The support portion is disposed at a top surface of the first casing such that the support portion support raises the second casing. The support portion partially defines an open portion that enables an access to the sheet discharged on the sheet discharge tray. The control panel is disposed at the second casing. A front end portion of the control panel is positioned forwardly of the discharge roller. The control panel is configured to enable operations of the image forming unit and the image scanner. The USB port is configured to receive a USB device. The USB port is positioned above the sheet discharge tray and overlaps, when viewed from the top, with the sheet discharge tray.

DETAILED DESCRIPTION

Figure 1:
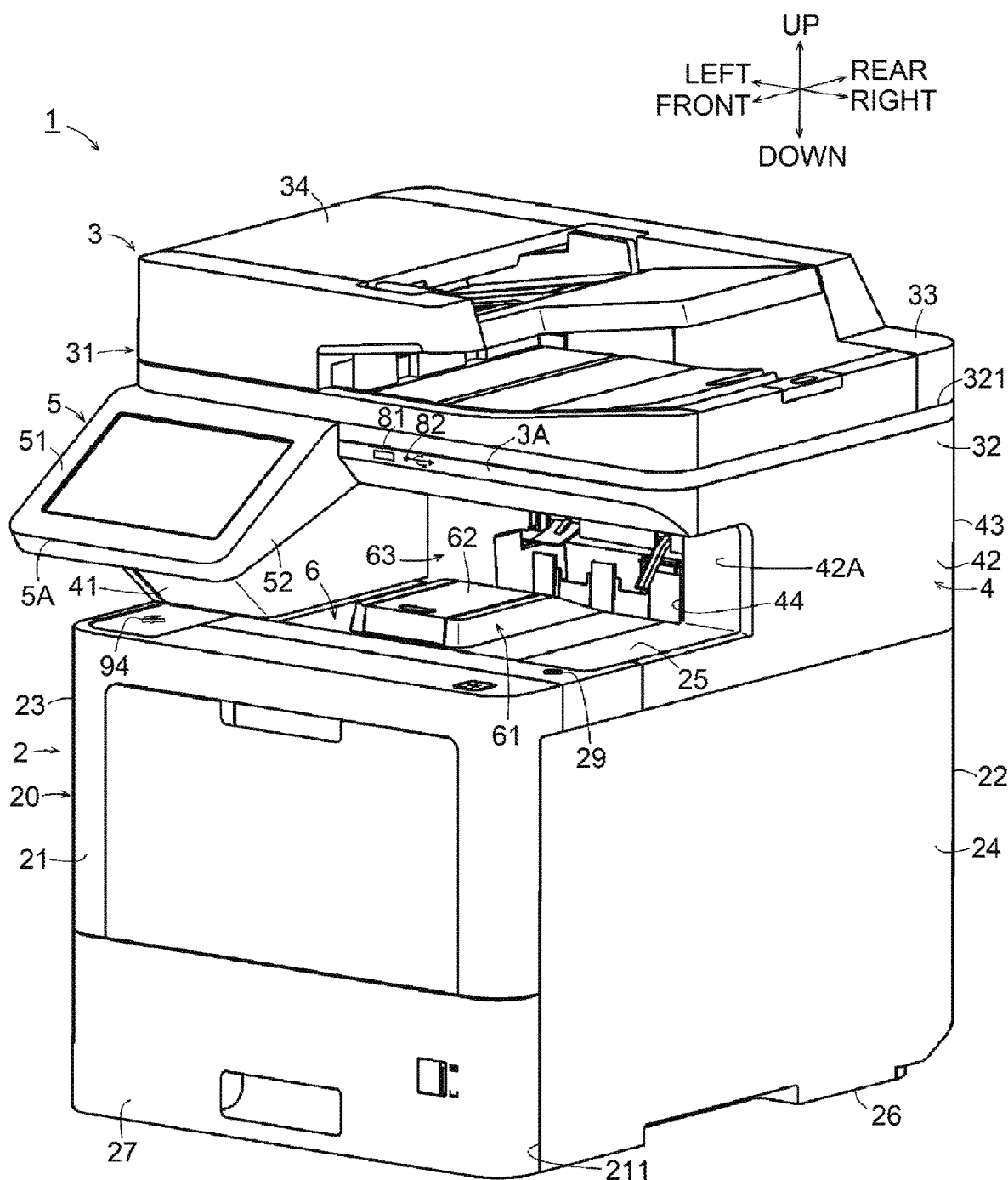
FIG. 1 is a perspective view of an image forming apparatus in an illustrative embodiment according to one or more aspects of the disclosure.

Respective directions of front, rear, left, right, top/upper, and bottom/lower are defined in conjunction with an orientation in which an image forming apparatus 1 is intended to be used, as depicted in FIG. 1. A side of the image forming apparatus 1 having a front surface 21 may be defined as a front side, and a side opposite to the front side may be defined as a rear side. A left side and a right side of the image forming apparatus 1 may be defined with respect to the image forming apparatus 1 as viewed from its front side. A side of the image forming apparatus 1 on which a second casing 3 is disposed is the upper side. A side of the image forming apparatus 1 on which a first casing 2 is disposed is the lower side. In the illustrative embodiment, the left-right direction is an example of a width direction perpendicular to a discharging direction of a sheet by discharge rollers 28.

[Configuration of Image Forming Apparatus]

Figure 2:
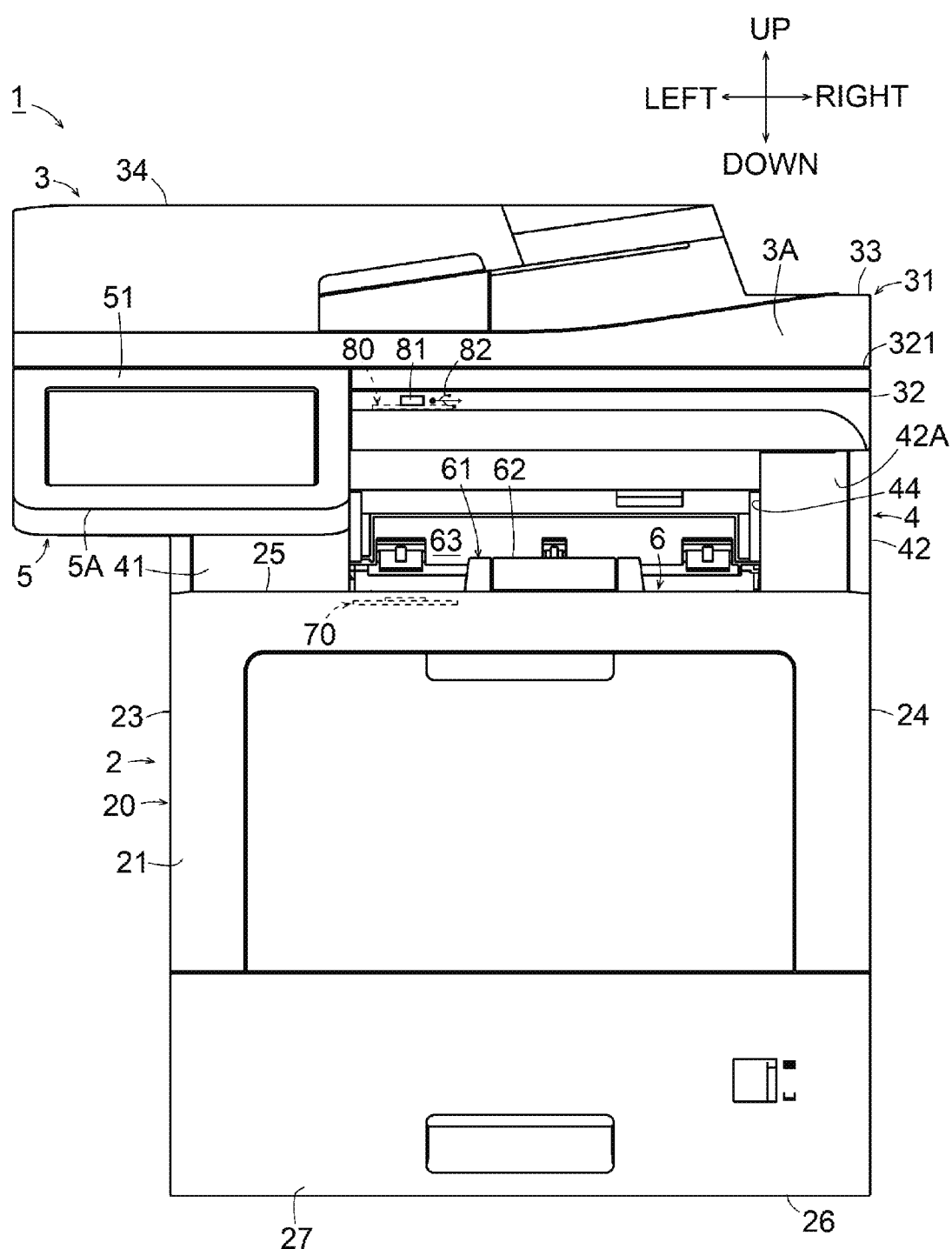
FIG. 2 is a front view of an image forming apparatus in an illustrative embodiment according to one or more aspects of the disclosure.
Figure 3:
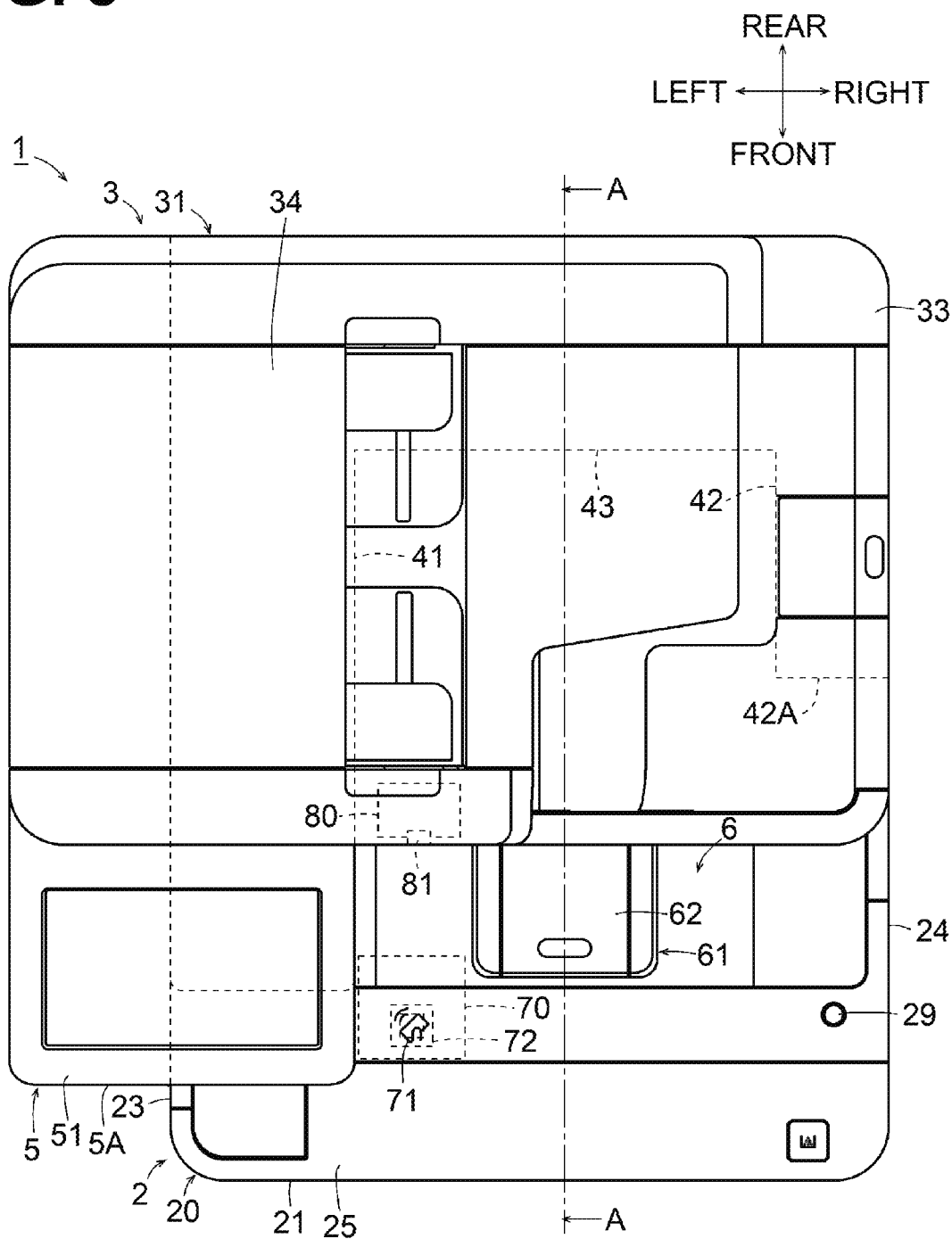
FIG. 3 is a top view of an image forming apparatus in an illustrative embodiment according to one or more aspects of the disclosure.
Figure 4:
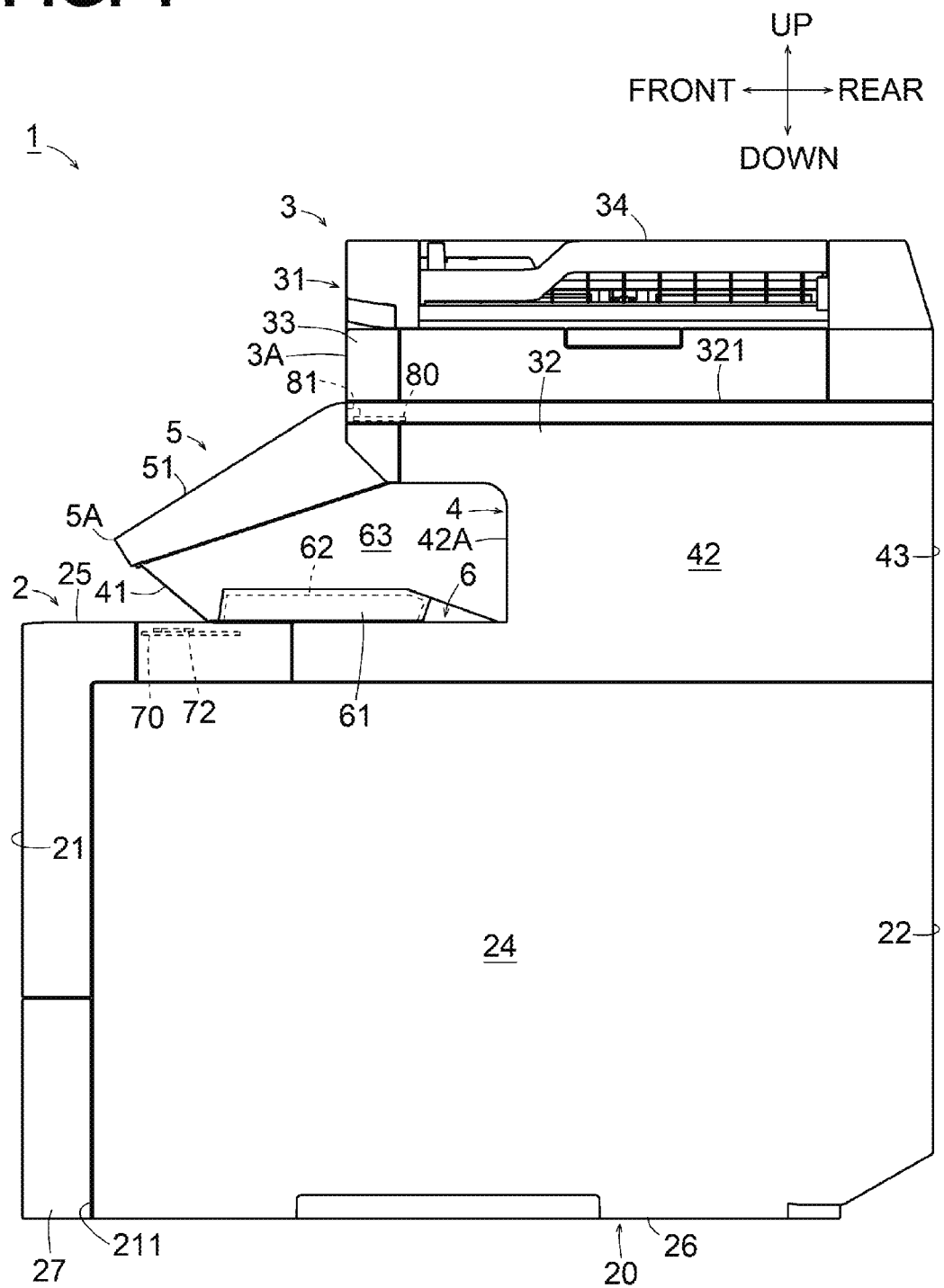
FIG. 4 is a right side view of an image forming apparatus in an illustrative embodiment according to one or more aspects of the disclosure.
Figure 5:
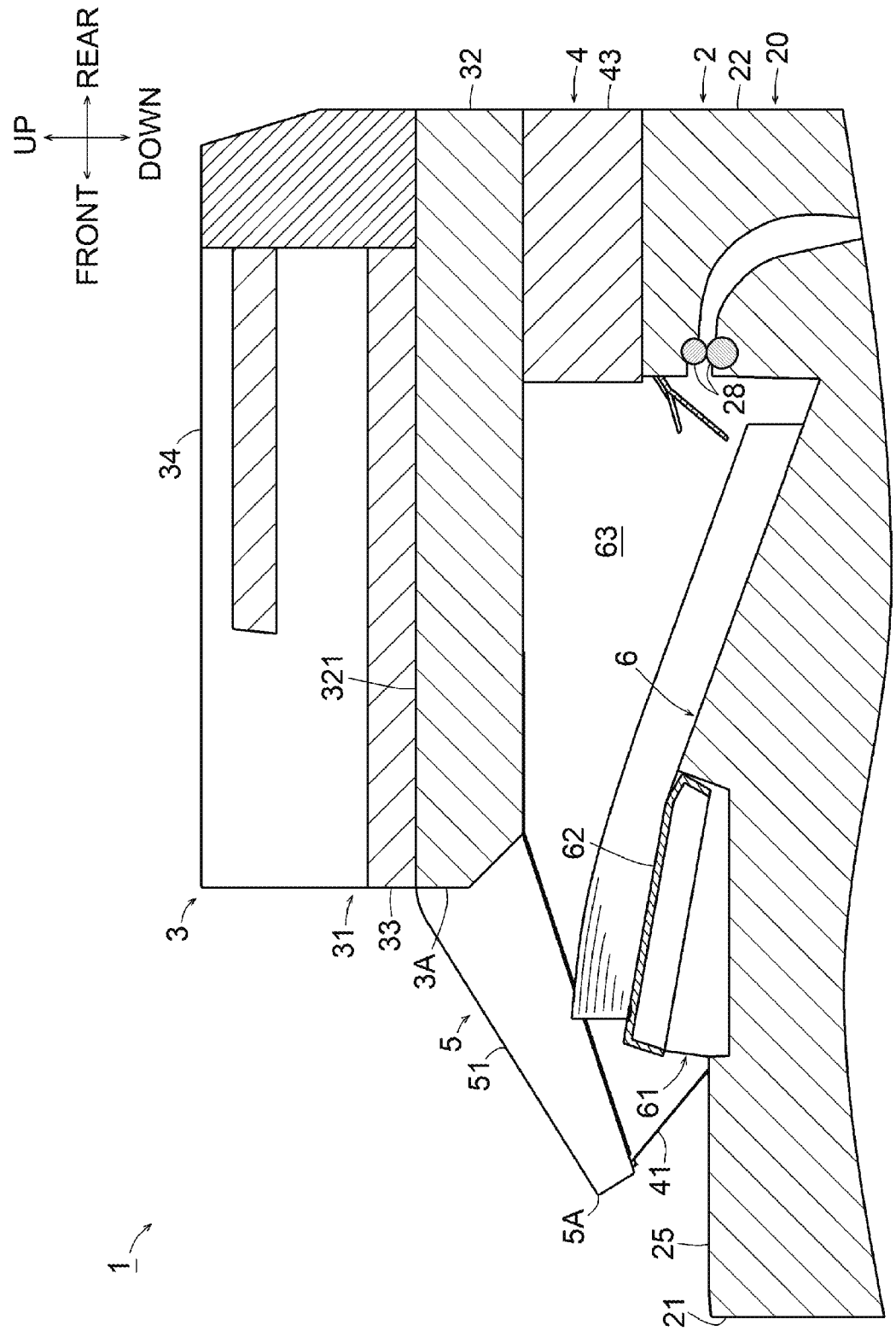
FIG. 5 is a cross-sectional view of the image forming apparatus of FIG. 3, taken along a line A-A, illustrating a discharged sheet stopper is in a use position.

FIG. 1 is a perspective view of the image forming apparatus 1 according to an illustrative embodiment. FIG. 2 is a front view of the image forming apparatus 1. FIG. 3 is a top view of the image forming apparatus 1. FIG. 4 is a right side view of the image forming apparatus 1. FIG. 5 is a cross-sectional view of the image forming apparatus 1, taken along a line A-A of FIG. 3, illustrating a discharged sheet stopper 62 is in a use position. The image forming apparatus 1 employs an interior sheet discharge system. The image forming apparatus 1 includes the first casing 2, the second casing 3, a support portion 4, and a control panel 5.

The first casing 2 includes a cover 20 having a generally rectangular parallelepiped shape. The cover 20 defines an appearance of the first casing 2. The cover 20 includes a front surface 21, a rear surface 22, a left surface 23, a right surface 24, a top surface 25, and a bottom surface 26. The cover 20 has an opening 211 at a lower portion of the front surface 21. Through the opening 211, a sheet tray 27 is attached or removed.

The first casing 2 houses the sheet tray 27 configured to support a stack of one or more sheets, a conveying mechanism configured to convey a sheet from the sheet tray 27, an image forming unit configured to form an image on the sheet conveyed by the conveying mechanism, a sheet discharge mechanism configured to discharge the sheet from the image forming unit to an exterior of the first casing 2. The sheet discharge mechanism includes the discharge rollers 28 disposed at a most downstream portion thereof in a sheet conveying direction (e.g., the sheet discharging direction).

The sheet tray 27 is configured to move in a front-rear direction between a fully attached position (as depicted in FIG. 1) and a separated position. At the fully attached position, the sheet tray 27 is fully attached to the first casing 2 through the opening 211. At the separated position, the sheet tray 27 is at least partially separated or removed from the first casing 2 toward the front through the opening 211. The image forming unit may form an image based on, but not limited to, an electrophotographic method, an inkjet method, or other method.

A sheet discharge tray 6 is located at the top surface 25 of the first casing 2. The sheet discharge tray 6 is configured to receive a sheet discharged by the sheet discharge mechanism. The sheet discharge tray 6 is formed on the top surface 25 of the first casing 2 into a convex shape curving upward from the rear side toward the front side. The sheet having an image formed thereon may be discharged by the sheet discharge mechanism in a rear-to-front direction onto the sheet discharge tray 6.

The sheet discharge tray 6 includes a protruding portion 61 disposed at a central portion thereof in the width direction, and the discharged sheet stopper 62 disposed at the protruding portion 61. The protruding portion 61 protrudes upward relative to other area of the sheet discharge tray 6. The protruding portion 61 has a trapezoidal shape whose rear portion is inclined downward. The discharged sheet stopper 62 has a generally rectangular plate shape. The discharged sheet stopper 62 has a rear end portion that is pivotally supported by the protruding portion 61. The discharged sheet stopper 62 is configured to move between an accommodated position (as depicted in FIG. 4) and a use position (as depicted in FIG. 5). At the accommodated position, the discharged sheet stopper 62 is flush with the upper end portion of the protruding portion 61. At the use position, a front end portion of the discharged sheet stopper 62 is raised. When the discharged sheet stopper 62 is in the use position, a sheet discharged onto the sheet discharge tray 6 may contact the discharged sheet stopper 62, so that the position of the sheet on the sheet discharge tray 6 may be regulated.

In a case where the sheet discharged on the sheet discharge tray 6 has curling ends, in the width direction, that curl upward, the protruding portion 61 raises and supports the central portion of the sheet in the width direction and may reduce the curling. When a stack of one or more sheets is supported on the sheet discharge tray 6, a space is provided below the stack near the protruding portion 61. The space may allow a user to hold the stack. The protruding portion 61 may not necessarily be provided but may be omitted.

The image forming apparatus 1 includes a power switch 29 disposed at the top surface 25 of the first casing 2. For easy recognition and operation, the power switch 29 may preferably be disposed at a portion of the top surface 25 of the first casing 2 further toward the front than the discharged sheet stopper 62 and outside an area of the sheet discharge tray 6 in the width direction. In the illustrative embodiment, the power switch 29 is located at a right front portion of the top surface 25.

The second casing 3 is disposed above the first casing 2 and includes a document scanner 31. The document scanner 31 includes a scanner casing 32. The scanner casing 32 includes a document glass 321 on an upper surface thereof. The document glass 321 is configured to support a document. The scanner casing 32 houses an image scanner configured to scan an image on the document supported by the document glass 321. The document scanner 31 further includes a document cover 33 disposed above the scanner casing 32. The document cover 33 is configured to pivotally move about a pivot axis provided at a rear end portion of the document cover 33 between a closed position and an open position. At the closed position, a front end portion of the document cover 33 is pivotally moved down and the document cover 33 covers the document glass 321. At the open position, the front end portion of the document cover 33 is pivotally moved up and the document cover 33 uncovers the document glass 321. The document cover 33 includes an auto document feeder ("ADF") 34 disposed at an upper portion thereof. The ADF 34 is configured to automatically feed a document to the document glass 321.

The support portion 4 includes a left support portion 41, a right support portion 42, and a rear support portion 43. The left support portion 41, the right support portion 42, and the rear support portion 43 are respectively disposed at a left end portion, a right end portion, and a rear end portion of the top surface 25 of the first casing 2, raising the second casing 3. The second casing 3 is disposed above the sheet discharge tray 6 via a discharge space 63 in which a sheet is discharged. The left support portion 41, the right support portion 42, the top surface 25 of the first casing 2, and a lower surface of the second casing 3 define an open portion 44 at a front side of the image forming apparatus 1. The discharge space 63 is open toward the front, via the open portion 44. A user can be accessible to a sheet discharged onto the sheet discharge tray 6 via the open portion 44.

In illustrative embodiment, the right support portion 42 includes a front end surface 42A that is located further to the rear than a front end surface 3A of the second casing 3. The configuration may allow a right portion of the discharge space 63 to open widely, allowing a user to take a stack of one or more sheets discharged on the sheet discharge tray 6 from the right side of the image forming apparatus 1.

The control panel 5 has a substantially rectangular parallelepiped shape. The control panel 5 has a dimension in the width direction equal to or less than a half of the dimension of the second casing 3 in the width direction. The control panel 5 extends frontward from the front end surface 3A of the second casing 3 such that a left end portion of the control panel 5 is flush with a left end portion of the second casing 3. The control panel 5 may be disposed at another portion of the second casing 3 as long as the control panel 5 is disposed downstream of the discharge rollers 28 in the sheet discharging direction. The control panel 5 is configured to enable operations of the image forming apparatus 1. The control panel 5 includes an upper surface 51 on which a display, such as an LCD panel, and an input device, such as a touchscreen and keys/buttons, configured to operate the image forming unit and the image scanner, are disposed.

[USB]

As depicted in FIG. 2, the image forming apparatus 1 includes a USB port 81 to which a terminal of a USB device, such as a USB memory and a digital camera, is connectable. The USB port 81 is disposed above the sheet discharge tray 6. Additionally, when viewed from the top, the USB port 81 is located at a position overlapping with the sheet discharge tray 6. Further, the USB port 81 is be provided such that at least a portion of a USB device inserted into the USB port 81 is located between the front end portion 5A of the control panel 5 and the front end surface 3A of the second casing 3.

In the illustrative embodiment, the USB port 81 is located at the front end surface 3A of the second casing 3 to the right of the control panel 5. As long as the USB port 81 overlaps with the sheet discharge tray 6 when viewed from the top, the position of the USB port 81 at the front end surface 3A of the second casing 3 may not be limited to a particular position.

The second casing 3 has a USB indication 82 provided, e.g., printed, at a portion of the front end surface 3A of the second casing 3 near the USB port 81. The USB indication 82 or the USB port 81 may help a user to recognize the location of the USB port 81.

Since the USB port 81 is located at a position overlapping with the sheet discharge tray 6, the USB device inserted into the USB port 81 may not stick out relative to a surface (e.g., a front surface) of the first casing 2 when viewed from the top. This configuration may reduce risks of damaging the USB device as a user hits the USB device. In addition, this configuration may ensure a space for attaching and removing the USB device. Since the USB port 81 is disposed above the sheet discharge tray 6, a user may visually identify the USB port 81 readily.

Further, the USB port 81 is provided such that at least a portion of a USB device inserted into the USB port 81 is located between the front end portion 5A of the control panel 5 and the front end surface 3A of the second casing 3. This configuration may prevent or reduce risks of damaging the USB device due to a user' hitting the USB device inserted into the USB port 81, while ensuring the visibility of the USB port 81. The USB port 81 located at the front end surface 3A of the second casing 3 may face a user. This configuration may allow the user to readily identify the USB port 81 and to attach/remove the USB device to/from the USB port 81. The image forming apparatus 1 thus has a novel configuration.

The USB port 81 may preferably overlap with the second casing 3 when viewed from the front. This configuration may allow a user to readily take a sheet from the sheet discharge tray 6 because a USB device inserted into the USB port 81 may not protrude into the open portion 44. In the illustrative embodiment, the USB port 81 is located at the front end surface 3A of the second casing 3 and overlaps with the second casing 3 when viewed from the front.

A USB board 80 is located inside the second casing 3. The USB board 80 is a circuit board having a generally rectangular shape. The USB board 80 includes the USB port 81 and circuits. The USB port 81 is disposed on an upper surface of the USB board 80 and protrudes frontward.

[NFC]

As depicted in FIG. 3, the first casing 2 has an NFC indication 71 provided, e.g., printed, on the top surface 25 of the first casing 2. The NFC indication 71 indicates a location to which an external device (e.g., an IC card and a smartphone) having an NFC function is to be brought into proximity to establish a wireless communication between the image forming apparatus 1 and the external device. The size and the shape of the NFC indication 71 are not limited to a particular size and shape. The NFC indication 71 may be provided in a manner other than printing. For example, the NFC indication 71 may include translucent member. The translucent member may illuminate the NFC indication 71 with a light source (e.g., a light-emitting diode) disposed under the translucent member. Using the NFC indication 71 as a guide, a user may place the external device on the NFC indication 71, thereby establishing a wireless communication between the external device and the image forming apparatus 1.

The NFC indication 71 may be located further toward the front than the USB port 81. The NFC indication 71 may be preferably located on the same side (e.g., a right side or a left side) of the image forming apparatus 1 as the USB port 81, with respect to a center line of the image forming apparatus 1 in the width direction. In the illustrative embodiment, the NFC indication 71 is disposed at a portion of the top surface 25 of the first casing 2 further toward the front than the sheet discharge tray 6 and the USB port 81.

This configuration may prevent or reduce interference between a USB device inserted into the USB port 81 and an external device brought into proximity to the NFC indication 71. This may lead to increased operability. Further, since the NFC indication 71 is disposed closer to a user, the user may readily place an external device on the NFC indication 71.

The NFC indication 71 and the USB port 81 are disposed on the same side of the image forming apparatus 1 with respect to the center line in the width direction. This configuration may allow a user to readily identify both the NFC indication 71 and the USB port 81 by looking in one direction. The NFC indication 71 is provided at a position of the top surface 25 of the first casing 2 other than an area of the sheet discharge tray 6 and may not be covered by a sheet discharged on the sheet discharge tray 6. This may ensure visibility of the NFC indication 71.

An NFC board 70 is located, facing the NFC indication 71, inside the first casing 2, to establish a favorable wireless communication between the image forming apparatus 1 and the external device. In the illustrative embodiment, the NFC board 70 is disposed under the NFC indication 71 along an inner surface (e.g., a lower surface) of the top surface 25 of the cover 20. The NFC board 70 is a circuit board having a generally rectangular shape. The NFC board 70 includes a loop antenna 72 and circuits, such as a communication circuit and a detection circuit.

The loop antenna 72 is disposed on an upper surface of the NFC board 70 such that the loop antenna 72 is located under the NFC indication 71. The loop antenna 72 is configured to transmit to or receive from an external device, radio waves for NFC communication. The communication circuit is configured to process the radio waves transmitted to or received from the external device into signals. The detection circuit is configured to detect a current that flows in the loop antenna 72, thereby detecting intensities of the radio waves transmitted or received by the loop antenna 72.

[First Modification]

Figure 6:
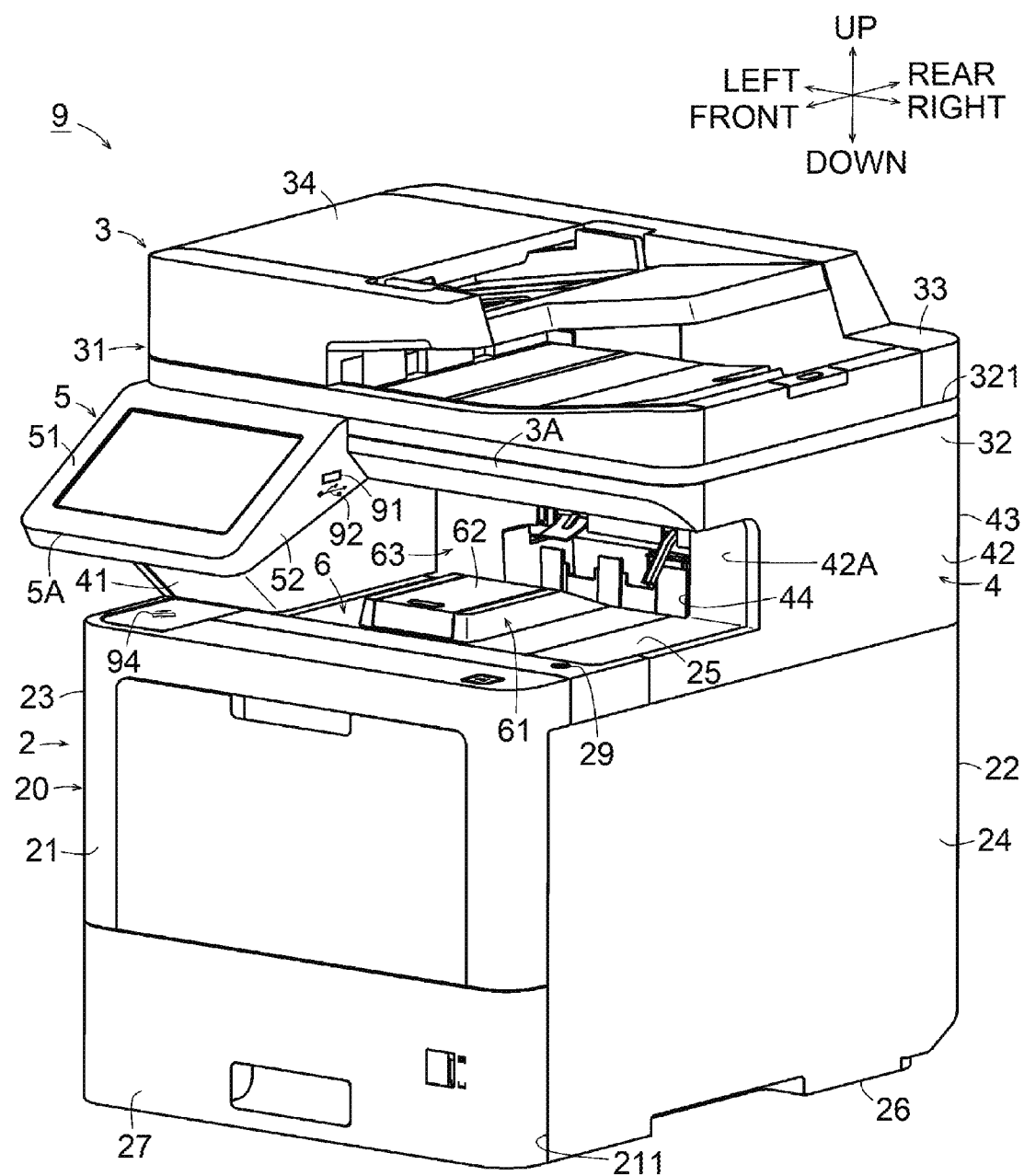
FIG. 6 is a perspective view of an image forming apparatus in a first modification according to one or more aspects of the disclosure.
Figure 7:
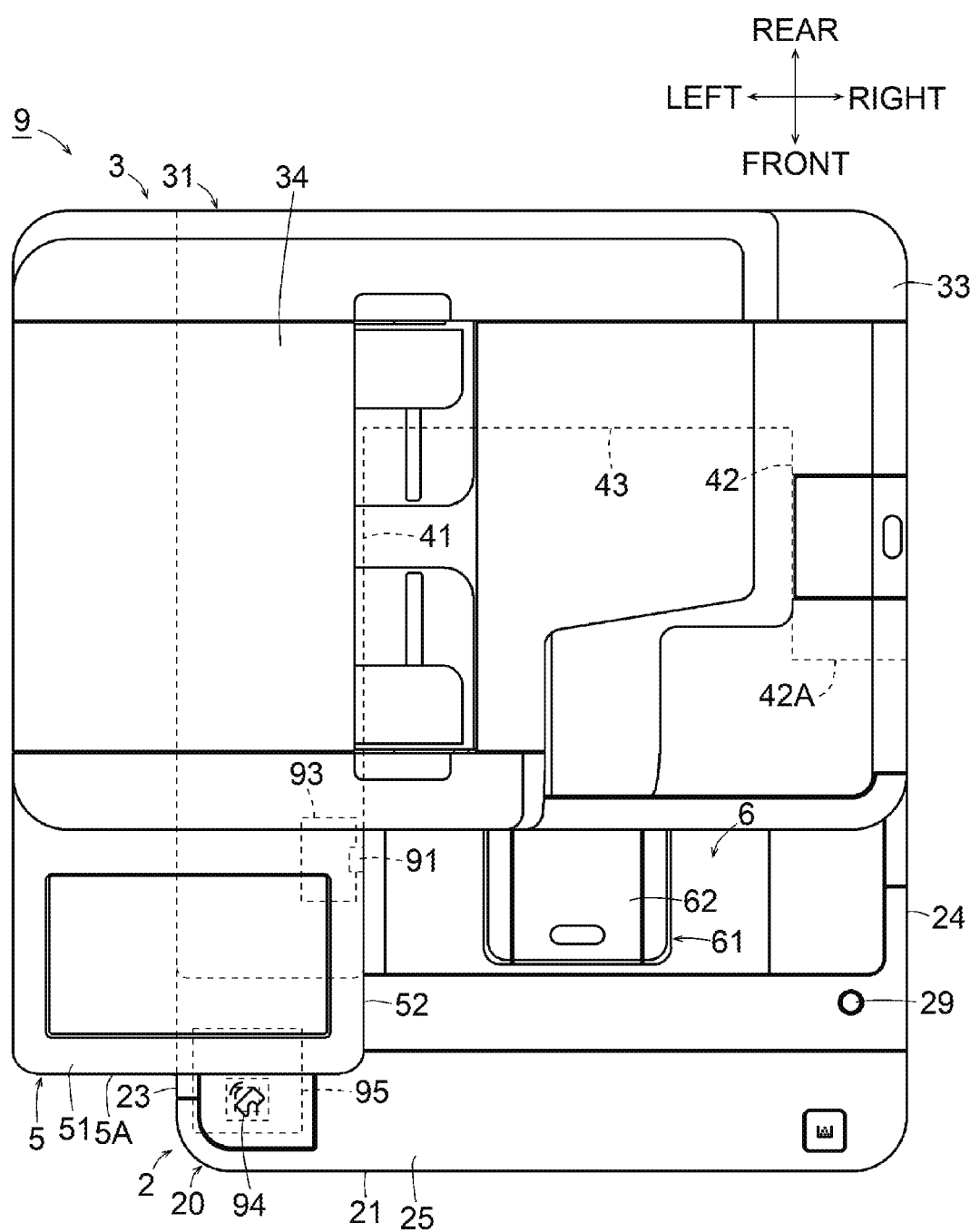
FIG. 7 is a top view of the image forming apparatus in the first modification.
Figure 8:
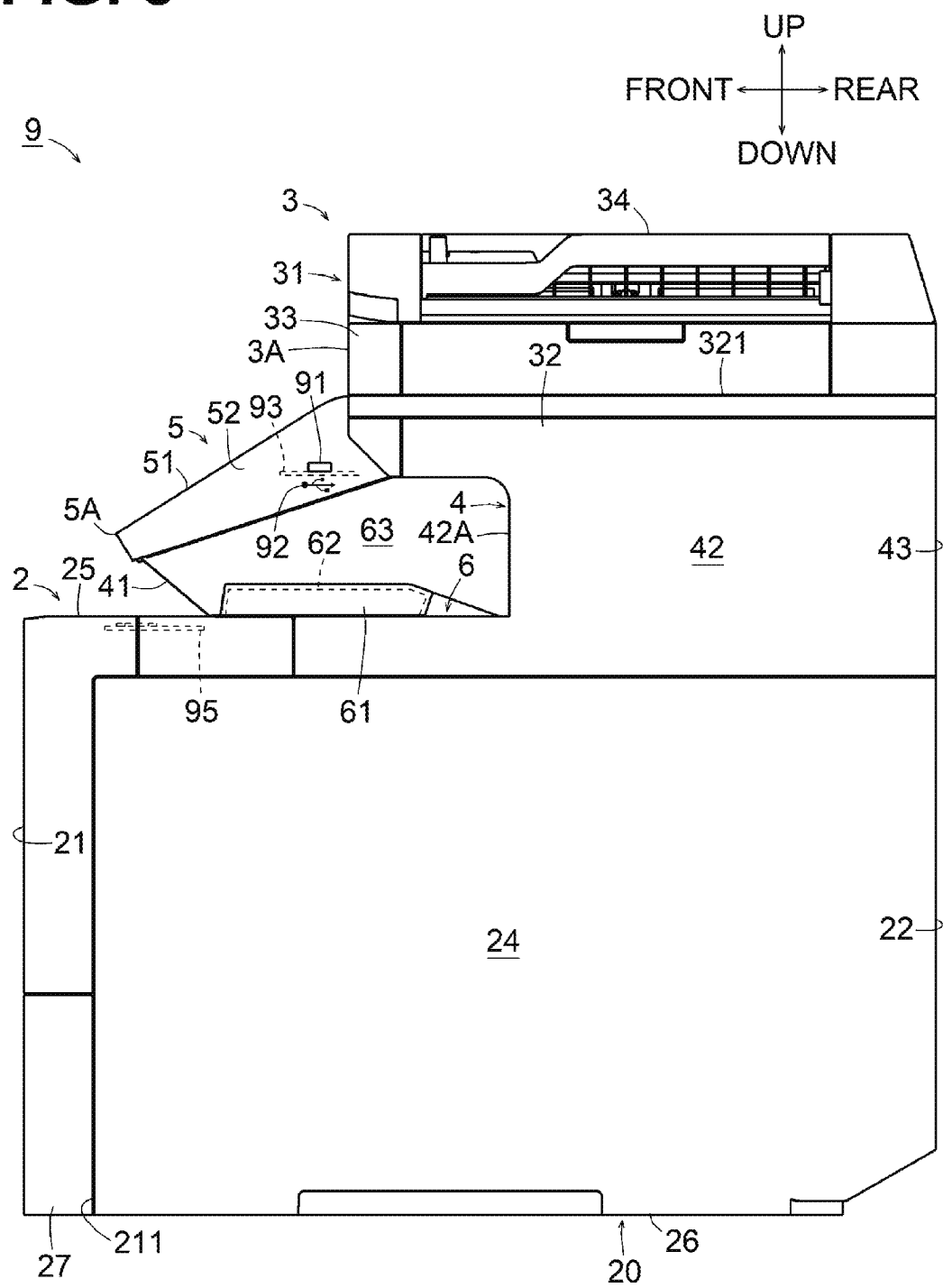
FIG. 8 is a right side view of the image forming apparatus in the first modification.

FIG. 6 is a perspective view of an image forming apparatus 9 according to a first modification. FIG. 7 is a top view of the image forming apparatus 9. FIG. 8 is a right side view of the image forming apparatus 9. The image forming apparatus 9 according to the first modification is different from the image forming apparatus 1 with respect to positions of a USB port 91, a USB indication 92, a USB board 93, an NFC indication 94, and an NFC board 95. Except for the positions of those components and indications 91-95, the image forming apparatus 9 has the same or similar configuration as the image forming apparatus 1. Like numerals in the drawings denote like components and the detailed description of those components described above is omitted, with respect to FIGS. 6-9.

The USB port 91 is located at a portion of the control panel 5 that satisfies the same conditions as the position of the USB port 81. As depicted in FIG. 6, the control panel 5 includes a right surface 52 having the USB port 91 and the USB indication 92 located near the USB port 91. The USB board 93 has the same or similar configuration as the USB board 80 and is located inside the control panel 5.

In such configuration in which the USB port 91 is disposed at the control panel 5, effects similar to those of the image forming apparatus 1 may be obtained. Additionally, the configuration may allow a user to readily identify both the control panel 5 and the USB port 91 by looking in one direction. The USB port 91 provided on a side surface of the control panel 5 in the width direction may enhance visibility of the USB port 91 and operability of the control panel 5 at the same time.

The NFC indication 94 is located at a position that satisfies the same condition as the position of the NFC indication 71. In FIGS. 6 and 7, the NFC indication 94 is located at a portion of the top surface 25 of the first casing 2 in front of the left support portion 41. The NFC board 95 has the same or similar configuration as the NFC board 70 and is located inside the first casing 2, facing the NFC indication 94.

In such configuration in which the NFC indication 94 is located at a portion of the top surface 25 of the first casing 2 in front of the left support portion 41, effects similar to those of the image forming apparatus 1 may be obtained. Additionally, the configuration may allow a user to visually identify both the control panel 5 and the NFC indication 94 by looking in one direction.

[Second Modification]

Figure 9:
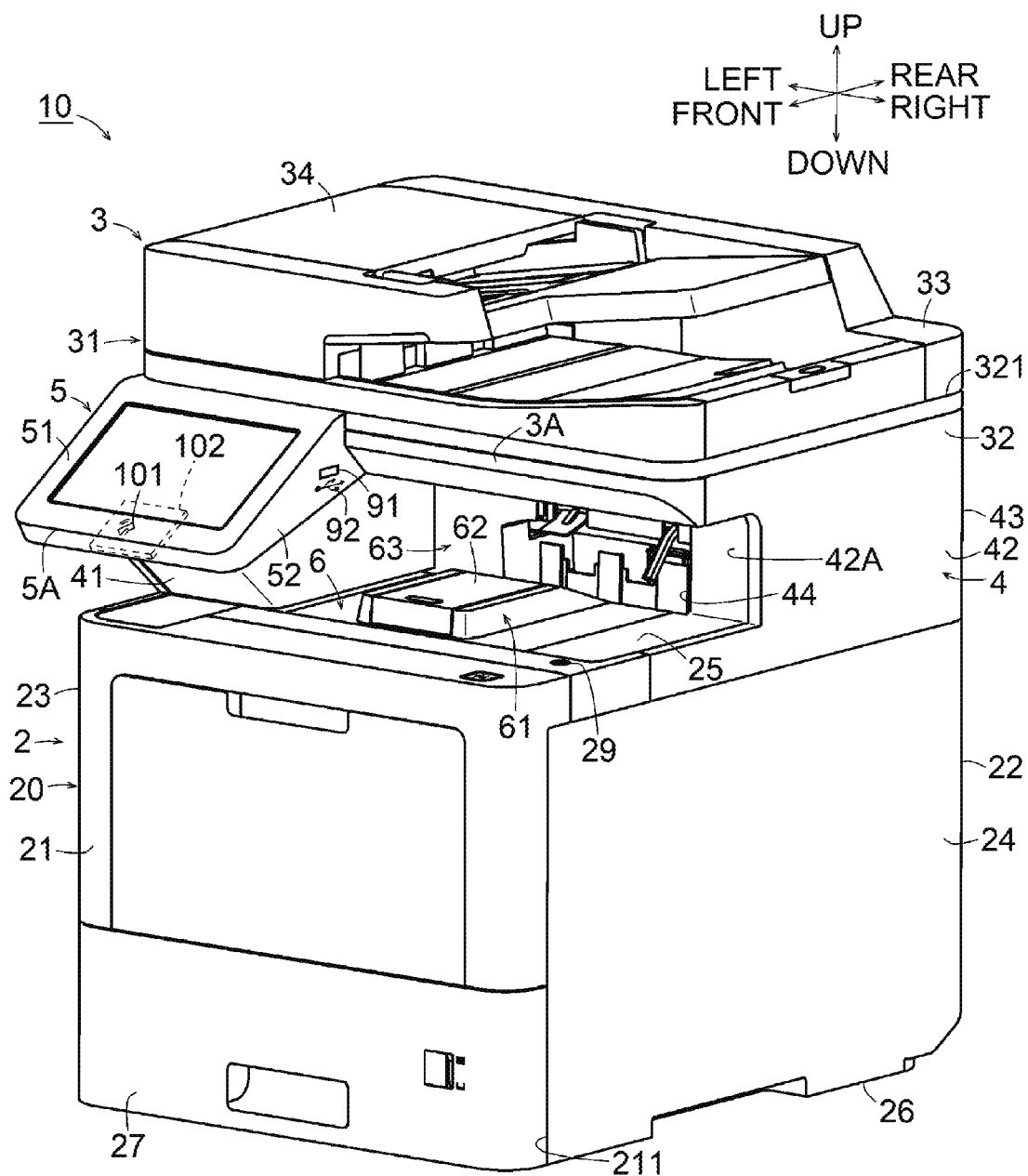
FIG. 9 is a perspective view of an image forming apparatus in a second modification according to one or more aspects of the disclosure.

FIG. 9 is a perspective view of an image forming apparatus 10 according to a second modification. The image forming apparatus 10 according to the second modification is different from the image forming apparatus 9 according to the first modification with respect to positions of an NFC indication 101 and an NFC board 102. Except for the positions of the NFC indication 101 and the NFC board 102, the image forming apparatus 10 has the same or similar configuration as the image forming apparatus 9.

The NFC indication 101 is provided at a portion of the control panel 5 that satisfies the same condition as the position of the NFC indication 71. In FIG. 9, the NFC indication 101 is located at a portion of the upper surface 51 of the control panel 5 near the front end portion 5A. The NFC board 102 has the same or similar configuration as the NFC board 70 and is located inside the control panel 5, facing the NFC indication 101.

The configuration of the second modification may obtain effects similar to those of the first modification. In addition, the upper surface 51 of the control panel 5 may face a user. Such configuration in which the NFC indication 101 is located at a portion of the upper surface 51 of the control panel 5 near the front end portion 5A may allow a user to readily identify the NFC indication 101 and to place an external device on the NFC indication 101.

What is claimed is:

1. An image forming apparatus, comprising:
   a first casing housing an image forming unit configured to form an image on a sheet, the first casing including a sheet discharge tray configured to support the sheet discharged by a discharge roller;
   a second casing disposed above the first casing, the second casing housing an image scanner configured to scan an image on a document;
   a support portion disposed at a top surface of the first casing such that the support portion support raises the second casing, the support portion partially defining an open portion that enables an access to the sheet discharged on the sheet discharge tray;
   a control panel disposed at the second casing, a downstream end portion of the control panel being positioned downstream of the discharge roller in a discharging direction, the control panel being positioned at an end portion of the second casing in a width direction perpendicular to the discharging direction and not overlapping, when viewed from the top, with the sheet discharge tray, the control panel configured to enable operations of the image forming unit and the image scanner; and
   a USB port configured to receive a USB device, the USB port being positioned above the sheet discharge tray and overlapping, when viewed from the top, with the sheet discharge tray.

2. The image forming apparatus according to claim 1, wherein the USB port overlaps with the second casing when viewed from the front.

3. The image forming apparatus according to claim 1, wherein the USB port is disposed at a downstream surface of the second casing in the discharging direction.

4. The image forming apparatus according to claim 1, wherein the USB port is disposed at the control panel.

5. The image forming apparatus according to claim 4, wherein the USB port is disposed at a side surface of the control panel that extends toward the downstream end portion of the control panel in the discharging direction.

6. The image forming apparatus according to claim 1, further comprising an indication positioned downstream of the USB port in the discharging direction, the indication indicating a location to which an external device is to be brought into proximity to establish short-range wireless communication between the image forming apparatus and the external device.

7. The image forming apparatus according to claim 6, wherein the USB port is located closer to one end of the image forming apparatus in the width direction than the other end of the image forming apparatus opposite to the one end in the width direction, and
   the indication is located closer to the one end of the image forming apparatus in the width direction than the other end of the image forming apparatus.

8. The image forming apparatus according to claim 6, further comprising a circuit board that enables the short-range wireless communication, the circuit board facing the indication.

9. The image forming apparatus according to claim 1, wherein the USB port is positioned such that at least a portion of the USB device inserted into the USB port is located between the downstream end portion of the control panel and a downstream end portion of the second casing in the discharging direction.

10. The image forming apparatus according to claim 1, wherein the second casing has the USB port on the downstream surface of the second casing in the discharging direction.

11. An image forming apparatus, comprising:

a first casing housing an image forming unit configured to form an image on a sheet, the first casing including a sheet discharge tray configured to support the sheet discharged by a discharge roller;

a second casing disposed above the first casing, the second casing housing an image scanner configured to scan an image on a document;

a support portion disposed at a top surface of the first casing such that the support portion support raises the second casing, the support portion partially defining an open portion that enables an access to the sheet discharged on the sheet discharge tray;

a control panel disposed at the second casing, a front end portion of the control panel being positioned further toward a front side than the discharge roller, the control panel being positioned at an end portion of the second casing in a width direction perpendicular to a discharging direction and not overlapping, when viewed from the top, with the sheet discharge tray, the control panel configured to enable operations of the image forming unit and the image scanner; and a USB port configured to receive a USB device, the USB port being positioned above the sheet discharge tray and overlapping, when viewed from the top, with the sheet discharge tray.

12. The image forming apparatus according to claim 11, wherein the second casing has the USB port on the downstream surface of the second casing in the discharging direction.

* * * * *